(12) United States Patent
Chen

(10) Patent No.: US 6,638,192 B2
(45) Date of Patent: *Oct. 28, 2003

(54) AUTOMATIC COOLING MECHANISM FOR ELECTRICAL DEVICE

(75) Inventor: Sun Chen, Shin-Chu (TW)

(73) Assignee: Mustek Systems, Inc., Shin-Chu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/413,504

(22) Filed: Oct. 6, 1999

(65) Prior Publication Data

US 2002/0049105 A1 Apr. 25, 2002

(51) Int. Cl.[7] ............... F16H 7/00; H05K 7/20
(52) U.S. Cl. ............... 474/148; 474/144; 361/695; 415/176
(58) Field of Search ............... 474/148, 76, 152, 474/84, 69–71, 73, 75, 144, 130; 358/496, 498, 474, 497, 296, 300; 271/110, 164, 265, 162, 38, 117; 128/204.15, 201.24, 201.29, 205; 415/122, 176; 62/236, 243, 323.1; 361/693–695, 900–965; 261/26, 109, 96

(56) References Cited

U.S. PATENT DOCUMENTS

| 2,385,152 | A | * | 9/1945 | Morrison | |
|---|---|---|---|---|---|
| 2,875,626 | A | * | 3/1959 | Niederer et al. | |
| 3,672,160 | A | * | 6/1972 | Kim | 60/281 |
| 3,712,065 | A | * | 1/1973 | Hurst | 60/274 |
| 4,252,751 | A | * | 2/1981 | Shito | 261/26 |
| 4,531,379 | A | * | 7/1985 | Diefenthaler, Jr. | 62/236 |
| 4,601,684 | A | * | 7/1986 | Geary et al. | 474/148 X |
| 4,875,670 | A | * | 10/1989 | Petersen et al. | 271/265 |
| 5,016,864 | A | * | 5/1991 | Nonami | 271/110 |
| 5,318,479 | A | * | 6/1994 | Lawroski | 474/130 |
| 5,386,823 | A | * | 2/1995 | Chen | 128/204.15 |
| 5,441,391 | A | * | 8/1995 | Frost et al. | 417/362 |
| 5,745,247 | A | * | 4/1998 | Yasui et al. | 358/300 |
| 5,871,412 | A | * | 2/1999 | Moser | 474/76 |
| 5,951,257 | A | * | 9/1999 | Matson | 416/246 |
| 6,031,721 | A | * | 2/2000 | Bhatia | 361/687 |
| 6,320,745 | B1 | * | 11/2001 | Chen | 361/695 |

* cited by examiner

Primary Examiner—Marcus Charles
(74) Attorney, Agent, or Firm—McGuireWoods LLP

(57) ABSTRACT

An automatic cooling mechanism is provided for an electrical device having a high-temperature element and a rolling shaft. The mechanism includes a fan mounted within the electrical device and a transmission mechanism connected between the fan and the rolling shaft for transmitting rotational kinetic energy from the rolling shaft to the fan to rotate the fan for reducing the temperature of the high-temperature element.

9 Claims, 4 Drawing Sheets

AUTOMATIC COOLING MECHANISM FOR ELECTRICAL DEVICE

FIELD OF THE INVENTION

The present invention relates to an automatic cooling mechanism, and more particularly to an automatic cooling mechanism for an electrical device.

BACKGROUND OF THE INVENTION

Today's electrical devices are required to have high integrations and high performances. Accordingly, some of the electrical elements are often have high temperatures. For example, an automatic document feeder (ADF) is developed to be used with a flatbed scanner. The ADF can automatically feed document sheets one by one to the flatbed scanner to be scanned. However, most of the ADFs are asked to have reduced volumes and increased document-feeding speeds. As a result, a lot of heat is generated by the elements such as the print circuit board of the ADF. Cooling elements made of aluminum or copper, etc. . . . are often used to reduce the temperature. However, the cooling effects are limited. The effect of a cooling cream is also limited. Furthermore, the cooling cream must be coated on the surface of the high-temperature uniformly, otherwise many problems may happen.

A more efficient method is to use a fan to cool the high-temperature element. However, conventional fan is equipped with a motor. The additional motor will also generate heat to increase the temperature within the electrical device. Furthermore, the additional motor will increase the cost.

It is then attempted by the applicant to deal with the above-mentioned problems.

SUMMARY OF THE INVENTION

An object of the present invention is to provide an efficient cooling mechanism for an electrical device.

Another object of the present invention is to provide a cooling mechanism for an electrical device without additional motor.

According to the present invention, an automatic cooling mechanism for an electrical device having a high-temperature element and a rolling shaft is provided. The device includes a fan mounted within the electrical device and a transmission mechanism connected between the fan and the rolling shaft for transmitting rotational kinetic energy from the rolling shaft to the fan to rotate the fan for reducing the temperature of the high-temperature element.

The transmission mechanism preferably includes an elastic element. The elastic element is preferable a belt, a rope, etc. . . .

The electrical device preferably further includes a shell structure for receiving therein the high-temperature element.

The fan may introduce air into the shell structure. Of course, in another embodiment, the air filled within the shell structure is exhausted by the fan.

The electrical device may further includes a hot-wind exist. The hot-wind exist preferably includes a plurality of holes formed on the shell structure.

The electrical device may be an automatic document feeder (ADF). The ADF preferably includes a plurality of rollers mounted on the rolling shaft for feeding thereby a document.

The present invention may best be understood through the following description with reference to the accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
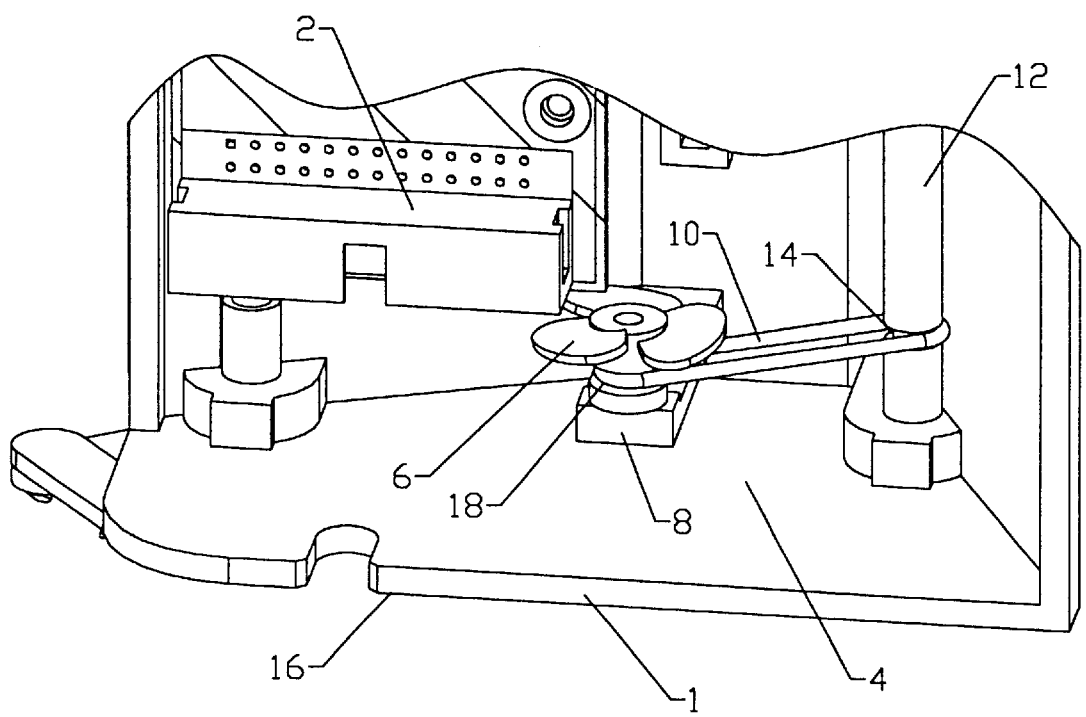
FIG. 1 illustrates an embodiment of a cooling mechanism for an electrical device according to the present invention.

Referring to FIG. 1, an electrical device 1 has a shell 16, a high-temperature element 2, and a rolling shaft 12. The high-temperature element 2 is a print circuit board (PCB) or other element that will generate heat during the operation of the electrical device 1. A cooling mechanism 4 is mounted within the electrical device 1. The cooling mechanism 4 includes a fan 6, a transmission mechanism 10, and a prop 8. Slots 14 and 18 are formed on the rolling shaft 12 and the fan 6 respectively for receiving therein the transmission mechanism 10 so that the fan 6 can be rotated through the rotational kinetic energy transmitted by the transmission mechanism 10. The transmission mechanism 10 is a belt, a rope, or any other elastic element.

The fan 6 and the rolling shaft 12 are connected by the transmission mechanism 10. Accordingly, the fan will be rotated in accordance with the rotation of the rolling shaft 12. Consequently, a cool wind will blow to the high-temperature element 2 and reduce its temperature.

The fan 6 is mounted just beside the high-temperature element 2 to blow to the high-temperature element 2 directly. However, the fan 6 can also be mounted at any suitable place to introduce cool air into the shell 16 of the electrical device 1 to reduce the global temperature within the shell 16.

Figure 2:
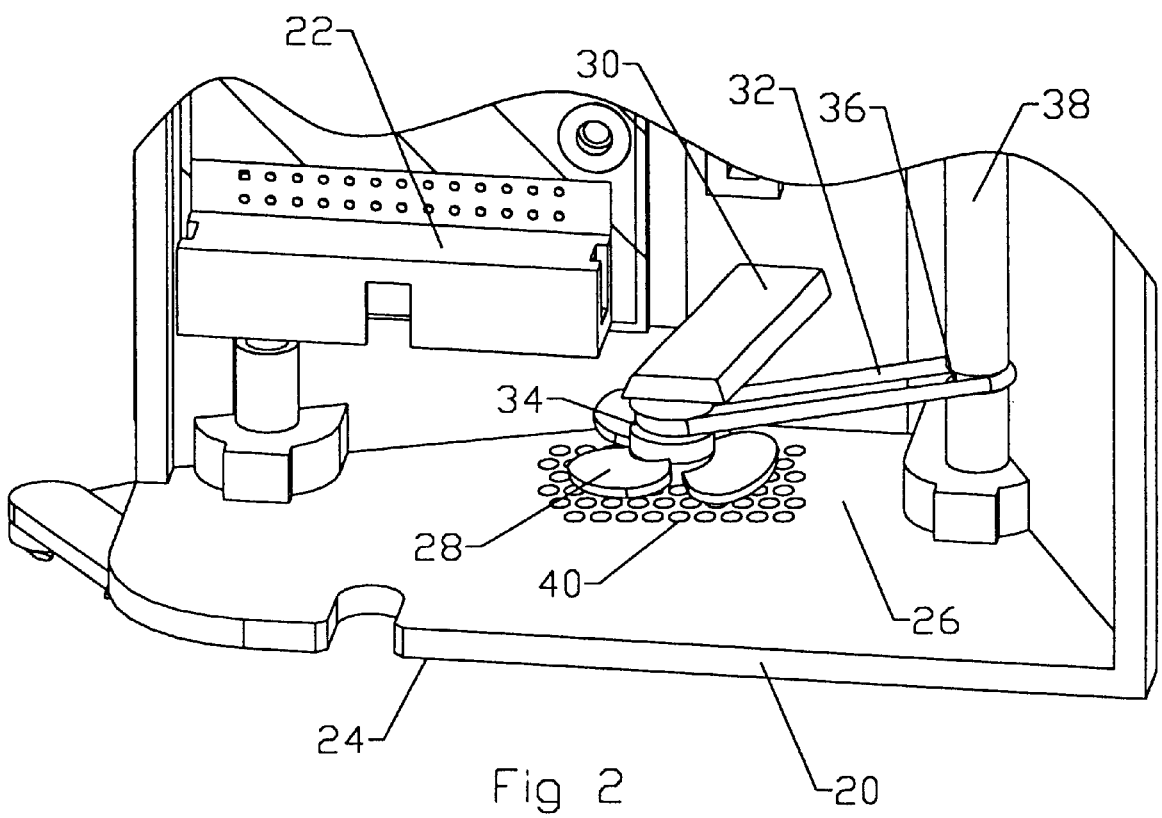
FIG. 2 shows another embodiment of a cooling mechanism for an electrical device according to the present invention.

In another embodiment, the fan is served as an exhaust blower. Referring to FIG. 2, an electrical device 20 has a shell 24, a high-temperature element 22, and a rolling shaft 38. A cooling mechanism 26 is mounted within the electrical device 20. The cooling mechanism 26 includes a fan 28, a transmission mechanism 32, and a prop 30. Slots 34 and 36 are formed on the rolling shaft 38 and the fan 28 respectively for receiving therein the transmission mechanism 32 so that the fan 28 can be rotated through the rotational kinetic energy transmitted by the transmission mechanism 32. The transmission mechanism 32 is a belt, a rope, or other elastic element. A hot-wind exit 40 is formed on the shell 24. The hot-wind exit 40 may be a plurality of holes or any other type of exit for exhausting hot air within the shell 24.

The fan is mounted on the prop 30 and is facing the shell 24. During the operation of the electrical device 20, the fan 28 is rotated in accordance with the rotation of the rolling shaft 38. Accordingly, the hot air is exhausted and the temperature within the shell 24 is reduced.

Figure 3:
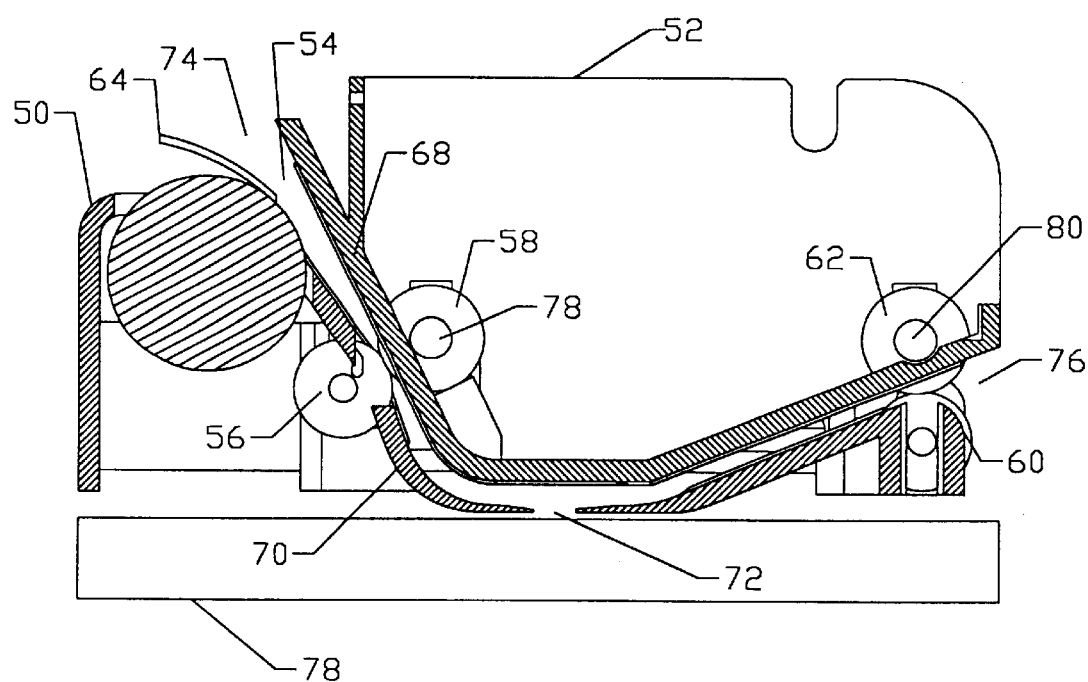
FIG. 3 illustrates an example of an automatic document feeder (ADF)

The rolling shaft is not reserved for the use of the cooling mechanism. For example, in an automatic document feeder (ADF) for a scanner, the rolling shaft is a part of the sheet-feeding mechanism. Referring to FIG. 3, an ADF 50 includes a body shell 52, a document-feeding path 54 formed on the bottom side of the body shell 52, and rollers 56, 58, 60, and 62 for urging the document sheet 64 to be moved in the feeding path 54. The document-feeding path 54 is formed by an inner shell 68 and an outer shell 70. The document-feeding path 54 further includes a scanning area 72, which is an opening formed on the bottom of the outer shell 70. A document 64 is urged by the rollers 56, 58, 60, and 62 to be moved in the document-feeding path 54. The document 64 enters the document-feeding path 54 from the entry 74 and leaves it from the outlet 76. The ADF 50 is mounted on a flatbed scanner 100 and the scanning area 72 is aligned to the reading unit (not shown) of the scanner 100. While the document 64 passes through the scanning area 72, it will be scanned by the scanner 100.

Because rollers are necessary for the ADF to transmit document, rolling shafts are necessary to provide rolling kinetic energy to the rollers. For example, rollers 58 and 62 are mounted on rolling shafts 78 and 80 respectively. During operation of the ADF 50, the rollers 56 and 60 are also rolling since they contact with the rollers 58 and 62 respectively. Accordingly, the document sheet 64 will be transmitted forwardly once it passes the rollers 56 and 58 or 60 and 62.

Figure 4:
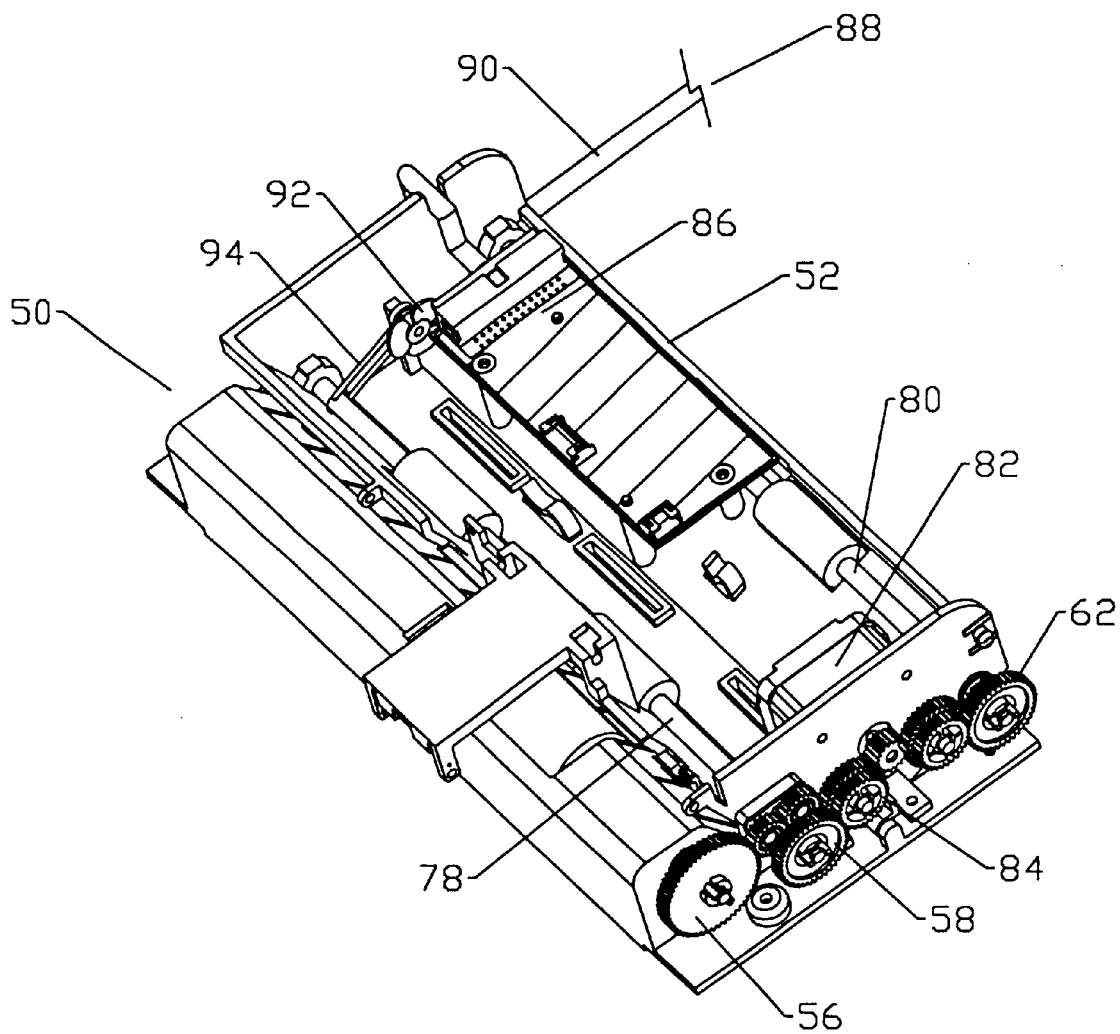
FIG. 4 shows an embodiment of a cooling mechanism mounted within the ADF illustrated in FIG. 3.

Referring to FIG. 4, the rotational kinetic energy of the rolling shafts 78 and 80 is provided by a motor 82 through the gear set 84. The ADF 50 further includes a PCB 86 connected to a power 88 by a wire 90. While the ADF 50 is operating, both the PCB 86 and the motor 82 will generate a considerable heat. Accordingly, a fan 92 is used to reduce the temperature within the body shell 52 of the ADF 50. Instead of using an additional motor, the fan 92 is connected to the rolling shaft 78 by a transmission mechanism 94 to obtain the rotational kinetic energy. The transmission mechanism 94 is a belt, a rope or other elastic element.

The present invention can not only be applied on the above-mentioned ADF, but also any other electrical device having a rolling shaft for a specified function. Since no additional motor is needed for the cooling mechanism of the present invention, the cost is reduced. Furthermore, the defect that an additional motor will further increase the temperature of the electrical device is avoided. Accordingly, the present invention is valuable for the industry.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cooling device for reducing the temperature of a scanner, comprising:

a first gear positioned on an axle of a power source;

a second gear connected to said first gear;

a rolling shaft connecting to said second gear;

a fan connecting to said rolling shaft via a transmission mechanism; and a plurality of holes formed in a shell of said scanner, and proximate said fan;

wherein said power source provides a rotational force to said first gear via said axle and said fan rotates jointly with the rotation of said first gear and said second gear.

2. The cooling device of claim 1, wherein said power source is a motor.

3. The cooling device of claim 1, wherein said power source is a roller.

4. The cooling device of claim 3, wherein said roller is connected to a motor.

5. The cooling device of claim 3, wherein said roller is rotated by a conveying gear set driven by a motor.

6. The cooling device of claim 1, wherein said fan introduces air into said scanner.

7. The cooling device of claim 1, wherein said fan exhausts air from said scanner for reducing the temperature.

8. An automatic cooling mechanism for an automatic document feeder, comprising:

a shell structure having a plurality of holes;

a fan mounted within said shell structure proximate said plurality of holes;

a first rolling shaft connectable to said fan;

a second rolling shaft having rollers;

a gear set connectable to said first and second rolling shafts;

a motor for providing rotational kinetic energy to said gear set; and a transmission mechanism directly connecting said first rolling shaft to said fan;

wherein said motor rotates said first and second rolling shafts via said gear set and said fan rotates via said transmission mechanism causing air to move through said plurality of holes.

9. The automatic cooling mechanism of claim 8, wherein said first and second rolling shafts are mounted partially within said shell structure.

* * * * *